US006981219B2

(12) United States Patent
Yang

(10) Patent No.: US 6,981,219 B2
(45) Date of Patent: Dec. 27, 2005

(54) METHOD AND SYSTEM FOR PROCESSING FORMULAS AND CURVES IN A DOCUMENT

(75) Inventor: George L. Yang, 15 Longfellow Ct., Freehold, NJ (US) 07728

(73) Assignee: George L. Yang, Owings Mills, MD (US)

( * ) Notice: Subject to any disclaimer, the term of this patent is extended or adjusted under 35 U.S.C. 154(b) by 589 days.

(21) Appl. No.: 09/994,548

(22) Filed: Nov. 27, 2001

(65) Prior Publication Data

US 2003/0101192 A1    May 29, 2003

(51) Int. Cl.[7] .................. G06F 17/24; G06F 17/27
(52) U.S. Cl. ............. 715/538; 715/500; 715/530; 715/531; 715/904
(58) Field of Search ................ 715/500, 530, 715/531, 538, 904

(56) References Cited

U.S. PATENT DOCUMENTS

| | | | | |
|---|---|---|---|---|
| 5,136,686 A | * | 8/1992 | Koza ................. | 706/13 |
| 5,189,633 A | * | 2/1993 | Bonadio ............. | 708/142 |
| 5,343,554 A | * | 8/1994 | Koza et al. ......... | 706/13 |
| 5,627,914 A | * | 5/1997 | Pagallo .............. | 382/189 |
| 6,750,864 B1 | * | 6/2004 | Anwar ............... | 345/440 |
| 6,760,483 B1 | * | 7/2004 | Elichai et al. ...... | 382/241 |

OTHER PUBLICATIONS

Latex Project Team, Latex2e for Authors, Jul. 31, 2001, Latex3 Project Team.*

* cited by examiner

Primary Examiner—Sanjiv Shah
Assistant Examiner—Joshua D Campbell

(57) ABSTRACT

A method and system are provided for a general computing software system to extract, reconstruct, save, and retrieve the information presented by an information source by assigning explicitly or implicitly properties to formulas, figures, and their components and making mathematics formulas as the bridges between the mathematics formulas in a document and the mathematics formulas and library functions in databases.

20 Claims, 5 Drawing Sheets

METHOD AND SYSTEM FOR PROCESSING FORMULAS AND CURVES IN A DOCUMENT

FEDERALLY SPONSORED RESEARCH

Not Applicable

SEQUENCE LISTING OR PROGRAM

Not Applicable

1. Field of the Invention

The invention relates generally to the information processing, and in particular to a method and system of extracting, reconstructing, saving, and retrieving the information of a file.

2. Background of the Invention

In many situations, it is necessary to verify the results presented in a file and save them for the future use. The process of verification involves at least choosing a right tool, programming in the required environment, running the code, and comparing the results. Typically, this process is pretty complex and time consuming. Although some computation software packages now are available, they have some limitations in many aspects.

It could be difficult to understand, modify, and reuse a programming code. In many software packages, programming could have to use totally different symbols for variables and functions than those in the file. This could make it difficult to understand the code especially after a long time. Though many software packages have the capability to export their codes in some programming language such as C, usually these codes are associated heavily with their special data structures. Hence it could be very difficult for a user to understand and modify them. When a software updates, or when a user switches to a different software, a program developed before under that software could not run at all.

In the information age, science and technology advance very rapidly. A user could have to read not only many papers published recently, but also the tremendous papers published in the past. It is necessary to provide user a tool with very friendly human interface and flexibility so that user can extract, reconstruct, save, and retrieve the information of any paper rapidly.

OBJECT OF THE INVENTION

It is a primary object of the present invention to provide a technical foundation for extracting, reconstructing, saving, and retrieving the information of a file.

Accordingly, it is an object of the present invention to provide a method to extract information from equations, formulas, and figures in a file.

It is an object of the present invention to provide a method to generate programming codes for equations, formulas, and figures in a file.

It is a further object of the present invention to provide a method for user to participate interactively programming code generation at different levels.

It is a further object of the present invention to provide a method to generate programming code dynamically.

It is a further object of the present invention to provide a method to allow a working document to be able to use any mathematics symbol and to generate programming code.

It is a further object of the present invention to provide a method for user to save programming codes and results for equations, formulas, and figures in a file in custom database.

It is a further object of the present invention to provide a method for user to retrieve programming codes and results for equations, formulas, and figures in a file from custom database.

It is a further object of the present invention to provide a method to make mathematics formulas themselves as the intermediates between the formulas in a working document and library functions.

It is a further object of the present invention to provide a method for a programming code to be able to call a library function written and compiled in a different programming language.

It is a further object of the present invention to provide a method for user to be able to use different numerical method to implement a mathematics function in a formula without literally changing the formula in a working document.

It is a further object of the present invention to provide a method to make the computation results available to a working document.

It is another important object of the present invention to extract, reconstruct, save, and retrieve the information provided by the curves in a figure.

SUMMARY OF THE INVENTION

It is well known that mathematics formula is the universal language. The basic idea of the present invention is to make use of this property by making mathematics formulas themselves as the intermediates among documents and library functions.

The second idea behind the present invention is to implicitly or explicitly associate as many properties as needed to variables, parameters, functions, equations, formulas, and figures so that the software system can make correct distinctions and decisions.

The software system of the present invention consists of an input file, a database, a custom database, working documents, model files, source files, result files as well as special information input.

The processing flow chart of the software system of the present invention consists of several major steps. Among them are setting up environment, initiating working documents, converting input file, applying pattern recognition, associating properties to mathematics symbols, variables, equations, formulas, figures, and their components, processing curve, processing equation and formula, generating model files, generating source files, updating working documents and database.

BRIEF DESCRIPTION OF THE DRAWINGS

The drawing figures depict preferred embodiments of the present invention by way of example, not by way of limitations.

DETAILED DESCRIPTION

Detailed descriptions of the preferred embodiment are provided herein. However, it is to be understood that the present invention may be embodied in many different ways. Therefore, specific details disclosed are not to be interpreted as limiting, but rather as a basis for the claims and as a representative basis for teaching one skilled in the art to employ the present invention in virtually any appropriately detailed system, structure, or manner.

Figure 1:
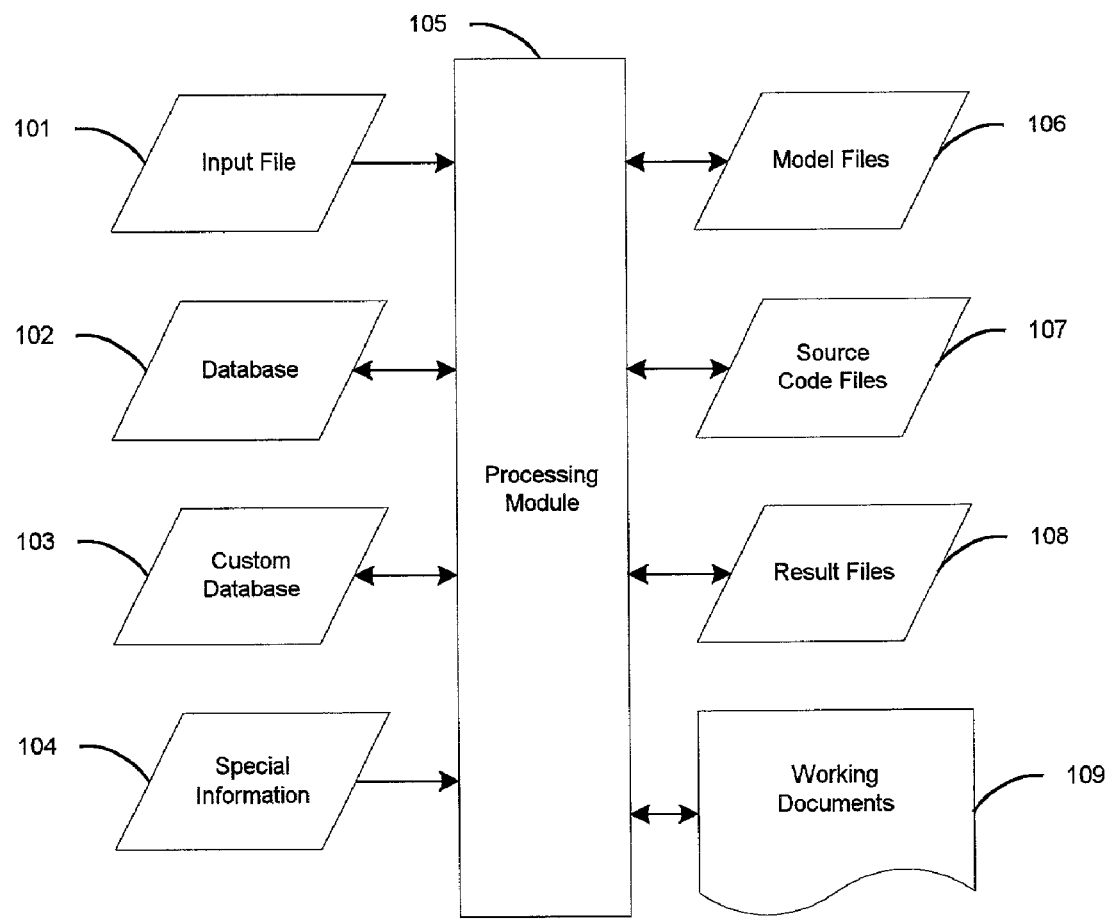
FIG. 1 illustrates an overview of the structure in block diagram form for the general computing software system of the present invention.

FIG. 1 illustrates an overview of the structure in block diagram form for the general computing software system of the present invention. There are some equations, formulas, and figures in the input file 101. This is the file that user wants to extract information from its equations, formulas, and figures, reconstruct its results, save its information in proper formats, and retrieve the information in future.

Database 102 is the database coming with the software system. The database includes help files, head files, data files, model files, source code files, dynamic link libraries, and static link libraries. It could also have other information such as paths for tools, files, and packages. Due to the extensive usage of matrix and vector in science and engineering, there should be matrix and vector objects in libraries. Through these objects, the operations of matrix and vector in a programming code could be very close to the ones in a formulas and therefore it will be easier to write and also easier to understand the programming code.

The help files of database 102 should provide enough information on each of the library functions. In the help file associated with each library function, there could be a driver program to show user how to use this function. User can copy, paste, and run the driver program. If any other library function is called or mentioned in the help file, there should be a high lighted link to that library function. An interface could also be provided for user to display the help file in different forms. For example, substituting some symbols in the formula of a help file with some new symbols, user can then copy or export a portion of the help file to a working document and make the working document look consistent. Due to the fact that mathematics formula is the universal language, a help file should use formulas and mathematics symbols to describe its functions whenever possible. Also an interface should be provided to associate explicitly or implicitly a function and its variables in a working document to the corresponding function and variables in a help file.

Custom database 103 is just like database 102 except this database is built by user. The software system could provide an interface to guide user to create a custom database 103. Through the custom database, user can save and retrieve information easily. A user can modify and save model files 106, source code files 107, data files, help files, and other custom files into the custom database 103.

Special information 104 is needed when the software system could not obtain enough or correct information from working document and databases. This could happen when a parameter does not take its default value, or a mathematics symbol does not assume its default meaning. Some intelligent sources such as a user could provide the special information 104.

Processing module 105 is the core of the software system. The primary function of processing module 105 is to extract information from the input file 101 with or without user interference, to assign properties to variables, equations, formulas and figures, to build model files 106, to generate source files 107, to produce the result files 108, and to update the working documents 109. Processing module 105 interacts with other blocks in FIG. 1. Because matrix and vector are most frequently met objects by engineers and scientists, a friendly interface should be provided to associate properties with matrix, vector, and their components, to display and modify these properties. Processing module 105 will present all the collected information in model files 106.

Another important function of processing module 105 is to provide glue tools among different programming languages. For example, suppose user wants to generate C code and this C code calls a function written and compiled in Pascal. In this situation, processing module 105 will automatically insert some glue code into the generated source code files 107 so that the compatible issue will be correctly addressed. In this way, instead of rewriting the code for that function in C, the software system can reuse the code developed before. Of course, for efficiency, the frequently used functions could be written and compiled in many different programming languages and all of them could simultaneously exist in the database 102 or database 103. With all the information collected, processing module 105 will be able to link a calling function to its corresponding function in a right library.

A further important function of processing module 105 is to provide dynamic coding on some library functions. Take the capacity formula $C=Wlog_2(1+S/N)$ as an example. When two of three components C, W and S/N are available, one can find the third one. One could write code for the formula with only one function that has all these three different possibilities or write code for the formula with three functions corresponding to three different possibilities. However, when there is enough information available, it is possible to generate the source code for a particular case on spot. With interacting with working documents, processing module 105 will know among C, W and S/N, which one is the unknown variable, and then it will generate code corresponding to that case. Here artificial intelligence could be involved in order to reform the formula.

Model files 106 serve as the template files of the source code files 107. The model files 106 exhibit all the information about the formulas and figures in working documents 109 in some sort of formal language. The model files 106 should be written in such a format that user can easily understand them without or with a little bit of explanation and documentation. User can modify the generated model files 106 in case there is a need for change. Also user can write the model files 106 from beginning by following the format of a model file.

Together with the database 102, custom database 103, and the model files 106, the software system will have all information necessary to generate source files 107. The source code files 107 could be in C, C++, Pascal, Java, or any other programming language supported by the software system. Again, a user can modify the source code files 107. Also the user can write everything from beginning by directly specifying packages, include files, data structures, and library functions Then user can compile the source files 107, link them to related libraries in database 102 and custom database 103, and run the program. The calculation results will be saved in the result files 108.

Working documents 109 are the documents on which a user is working. The documents could look like regular documents with texts, equations, formulas, and figures. Being different from regular documents, working documents 109 may have equations, formulas, figures, and their components directly or indirectly associated with many properties. Those properties could be hidden in regular document view and can be displayed when user selects property view to exam the relations among them.

There are two editors specially for working documents 109. One is mathematics formula editor and another is figure editor. The mathematics formula editor not only has to provide an environment for user to create, edit, and display a formula, but also has to extract and organize the information provided by the formula. The information could include the symbol identification code for a mathematics symbol, the index of a component in vector or matrix, if a symbol is a normal symbol or superscript or subscript. Similarly, the figure editor not only has to provide an environment for user to create, edit, and display a figure, but also has to extract and organize information provided by a figure. The information could include if it is a discrete or continuous curve, if there are accurate marks, which parameter associated with which curve.

Being different from most programming code files, the working documents 109 treat all symbols and characters legal. The properties associated explicitly or implicitly with equations, formulas, figures, and their components will guide the software system to bind them to the corresponding ones in model files 106 and source files 107.

Figure 2:
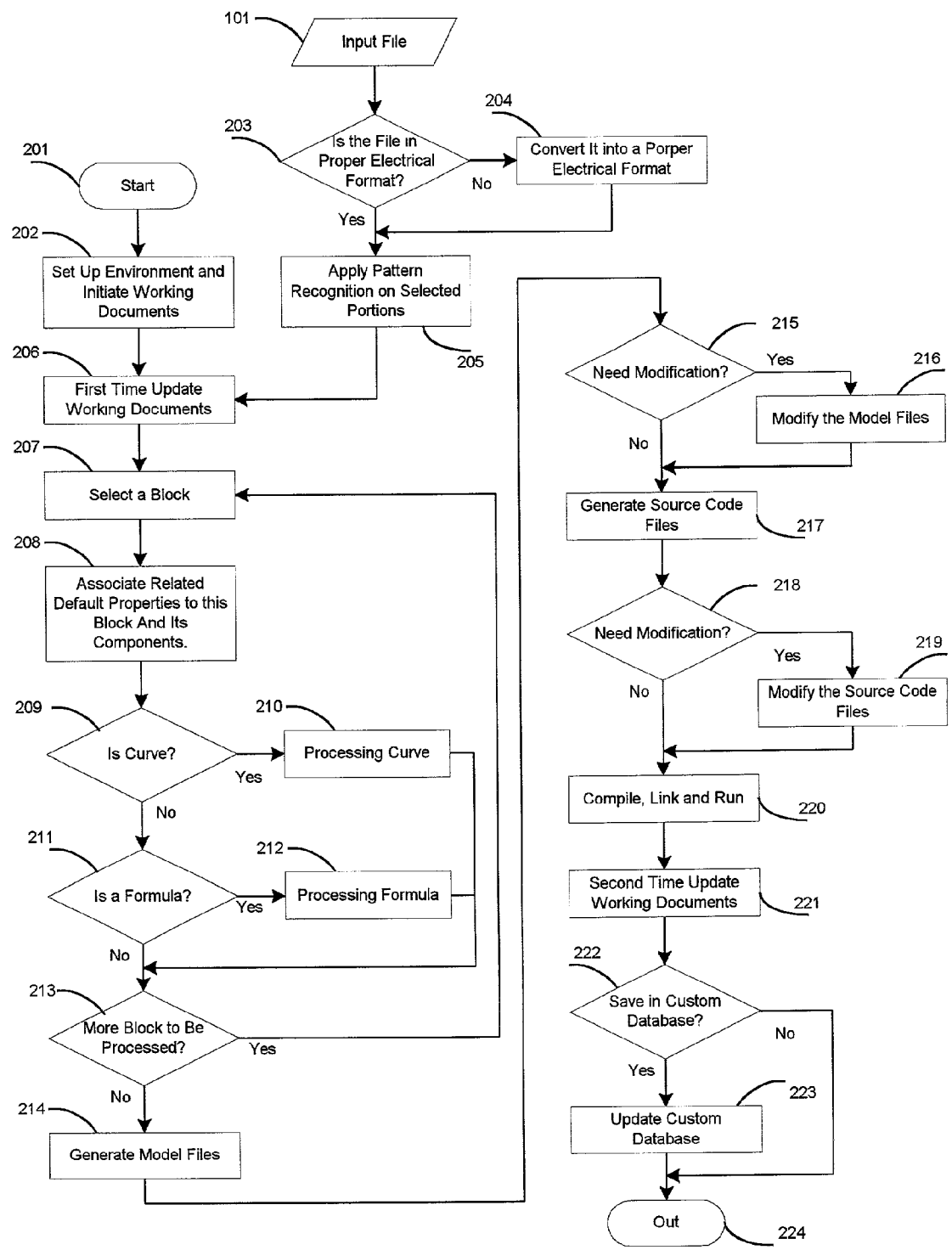
FIG. 2 illustrates an overview of operational steps in flow diagram form for the general computing software system of the present invention.

FIG. 2 illustrates an overview of operational steps in flow diagram form for the general computing software system of the present invention. The operation starts at step 201. At step 202, a user can set up environment and initiate working documents 109. The software system should provide user friendly interfaces to set up the environment, allow user to specify if the setting is permanent or section only, let user be able to save the setting in a file so that the setting can be retrieved.

More specifically, the software system could provide the following interfaces to user. The interface to define the default binding rule by specifying what kind of property should be bounded to what kind of symbols, variables, functions, equations, formulas, and curves; the interface to specify the priority of a particular property; the interface to select a default library from many libraries; the interface to set up the default paths for the working documents 109, model files 106, results files 108 and source code files 107; the interface to set up the default parameters for a set of library functions; the interface to change the default meanings of some mathematics symbols; the interface to setup the default mappings for symbols; the interface to specify the set of letters of the input file; the interface to set up the default programming language and the default data storage format; the interface to specify the precision and ranges of variables. Through these interface, user can modify the environment. For example, user can setup some default parameters related to numerical method, such as the maximum allowed error and the maximum number of terms for evaluating infinite series; user can set $f^{(i)}(x)$ to be the No. i function in a set of functions instead of the No. i derivative of function $f(x)$, the default meaning of $f^{(i)}(x)$; if only English letters are allowed in formulas, user can define a default mappings between the Russia letters and English letters, then the conversion from Russia to English letters will proceed automatically and systematically; if the input file contains English letters only, user can specify the set of input letters to English only, and therefore increase the probability for pattern recognition to recognize the input letters correctly.

Another important interface the software system should provide is to make user be able to define new properties and the corresponding actions.

At step 203, check if the input file 101 is in a proper electrical format. The input file 101 could be on pieces of paper or in electrical form. It could be a regular standard print or a handwriting. The proper electrical formats are the formats recognized by pattern recognition processing. The proper electrical formats could include most encountered formats such as pdf and ps. If the file is already in a proper electrical format, proceed to step 205. If not, at step 204, convert it into a proper electrical format.

At step 205, select the interesting portions such as equations, formulas, and figures from the file already in a proper electrical format and apply pattern recognition on the selected portions. The pattern recognition uses various methods to recognize the symbols in the selected portions. The output of pattern recognition will go through a processing such as symbol mapping and then further converted into the format used by a working document.

The converted portion again consists of symbols, equations, formulas, and figures and looks just like the ones in input file 101. However, there are some big differences between them. First of all, the original symbols, equations, formulas, and figures could consist of nothing more than sets of bitmap and be not recognizable by mathematics formula editor and figure editor, while the new ones are in the format required by the working document and therefore are recognizable by these editors. Second, the original symbols could be in bitmap format and therefore user can not select an individual symbol by just clicking on that symbol, while the each new symbol is bounded as an inseparable unit and therefore user can select each individual symbol. Third, all the useful information about a symbol, such as if it is a regular letter, a bold letter, an italic letter, superscript, and subscript will be extracted. Fourth, the regenerated new symbol could have a symbol identification code associated with it.

For example, the integration symbol $\int$ in input file could consist of bitmap but the new integration symbol could have an integration symbol identification code associated with it even if the image of the new integration symbol could still be in bitmap form. The software system will use the extracted information and symbol identification code in the later stages such as generating token and generating symbol table. In case that the selected portion is a figure of a set of curves, the output of pattern recognition will still consist of a set of curves, but internally the software system uses a set of ordered pairs to represent each of these curves. When a curve is a continuous curve, the software system will extract the relation between x-axis and y-axis with highest precision, represent the relation by a set of ordered pairs, and attach a "Continuity" property to the curve. If a curve has some accurate marks on it, the software system will represent the positions of these marks by another set of ordered pairs, and attach an "Accurate" property to the curve. If a curve is a discrete curve, internally the software system will describe it by a set of ordered pairs.

At step 206, the user can update the working documents 109 by combining the initial documents with the one converted from the output of pattern recognition. Some manual correction could be needed especially when the pattern recognition is not intelligent enough to extract correctly all the useful information from the input file or when the user simply wants to make some modifications on the rebuilt equations and formulas. Through the working documents 109, the software system provides user a highest level programming tool to specify the problems and the solutions in mathematics formulas.

At step 207, a meaningful block will be selected explicitly or implicitly. Here a meaningful block means that it is a block related to a formula or an equation or a figure. As a preprocessing, a user or some kind of artificial intelligence can select a meaningful block and assign a "Block" property to the block. The "Block" property will indicate the software system which portions of the working documents 109 it has to process and which portions to ignore. With collecting more and more information from processing previous blocks, the software system should handle later blocks better and better.

At step 208, the software system will provide an interface to associate default properties to the block and its components. For simplicity, an item will be used for reference to a letter, a mathematics symbol, a variable, a function, an equation, a formula, a figure or a component of a figure. Various properties could be attached to an item. For example, suppose by default i is an integer variable, but in some particular block it could be a real variable. Then a "Variable Type" property will be attached to variable i and this property will be set to real. Here is another example. In most of situation, d=ab+c could mean that first variable a times variable b, and then variable c will be added to the product, finally the result will be assigned to variable d. However, it could happen that ab is just a single variable. A "Bound" property will be associated with ah to bind a and b together. This example can also show that the some property could have higher priority than some other properties. Usually people want that whether pointing to a or b of ab, when they assign any property to it, this property will be assigned to ab as it is a single variable. The symbols bounded together could be adjacent to each other as one shown above or could not neighbor each other at all. For example, the integration sign ∫ and its correspondence dx in most cases do not sit together. An item that is a meaningful unit and can not be further separated into meaningful sub items will be called an atom.

At step 209, test if the block is related to curve. The judgment could be based on the information extracted by mathematics formula editor or figure editor or pattern recognition, or provided by user. If it is related to curve, the block will be assigned a "Curve" property and will be handled by processing curve subsystem as shown by step 210. If it is not, test if it is related to equations or formula at step 211. Here we do not try to distinguish between an equation and a formula and we just simply call either a formula or an equation a formula. If it is a formula related block, the block will be marked as "Formula" and will be handled by processing formula subsystem at step 212. Again, the information needed at step 211 can be obtained by mathematics formula editor or pattern recognition, or provided by user. After returning from either curve processing subsystem or formula processing subsystem, the software system will check if there is any more block to be processed at step 213. If there is any, go back to step 207 and repeat the steps from 207 to 213. If there is no more block, proceed to step 214 and generate model files 106.

Information collected from step 210 and step 212 will be saved in the model files 106. The model file 106 will show the skeletons of formulas and figures as well as information such as which function is associated with which function, and which variable is associated with which variable. When there is anything supposed to defined but not defined or specified, the software system will issue an error warning. The model files 106 should have a format easy to follow and at same time be able to provide enough information for generating source code files 107.

At step 215, the software system will inquire user if there is anything needed to change in the model files 106. If user wants to make some change, at step 216, the software system will provide a working environment for user to make change. Also one can directly write the model files 106 by following the format requirement of a model file. A model file could include some model files developed before and the model file can also be saved for future use. Even though there could be some manual manipulation involved, one could still save a lot of time by providing only the frameworks of mathematics formulas and avoiding directly dealing with the programming language, data structures and coding. Through the model files 106, the software system provides user a chance to further involve with the generation of programming codes without actually writing the codes in detail.

At step 217, one can generate source code files 107 in any programming language that the software system supports. With the information provided by the model files 106, the software system will be able to do all necessary tasks such as calling the related functions in the library and passing the right variables to the functions. When the source code calls a library function compiled in a different programming language, the software system will insert some glue function codes into the source code files to take care of all the compatible issues. For example, if the software system generates the source code in C and there is a call to a library function compiled by Pascal, then some glue functions should be inserted automatically before and after the call to that library function. One role of the glue functions is to make proper conversion between the variables in different programming languages.

At step 218, the software system will ask user if user wants to change anything. If user wants to change something, the software system will provide an environment to do all necessary modifications at step 219. Of course, user can write source code directly in a supported programming language by including related include files, calling the right library functions, inserting glue code as needed, using the data structures defined in the related libraries, and specifying related packages and paths. The most frequently encountered objects should be included in one of the libraries of database 102. Through these objects, it could be easier for user to understand the generated source code and it could also be easier for user to write source code from scratch. Matrix and vector are such objects. Due to their widely usage in science and engineering, it is preferred to handle them through an object-oriented approach.

When the source code is ready, user can compile the source code file, link to the supplied libraries and user's own custom libraries, and run the program at step 220. The results will be saved in result files 108.

At step 221, the software system will insert the results back into the working documents 109 that are waiting for the results. This can be done by assigning "To Be Filled" property to the holding marks where the results are supposed to put back into the working document. Each of the "To Be Filled" property contains the holding mark identification number. This identification number could be a number or a string or their combination. In the result files, the results corresponding to a holding mark will also be assigned "Result" property. Each of the "Result" properties contains a corresponding holding mark identification number. Through the holding mark identification number, the software system will be able to insert the results back to the right places in the working documents 109.

At step 222, the software system will inquire user if to save the information in custom database 103. If not, proceed to step 224 and finish the processing. If user wants to save the formulas, figures, or results into custom database, proceed to step 223. The software system will provide interface for user to specify which files to save and how data should be formatted. User could save the working documents 109, or the model files 106, or the source code files 107, or the related objective files or all of these files. Also user can manipulate the results in any way. For example, user could convert the data in ASCII format into binary format. The software system could provide environment to assist user to create help files in a way consistent with the help files coming with the software system. The generated help files should allow user be able to associate the external functions and their variables in working documents to the corresponding ones in the generated help files. Various database related technologies could be used to manage and update the database so that the relations among various codes, data, and help files will be correctly maintained.

Figure 3:
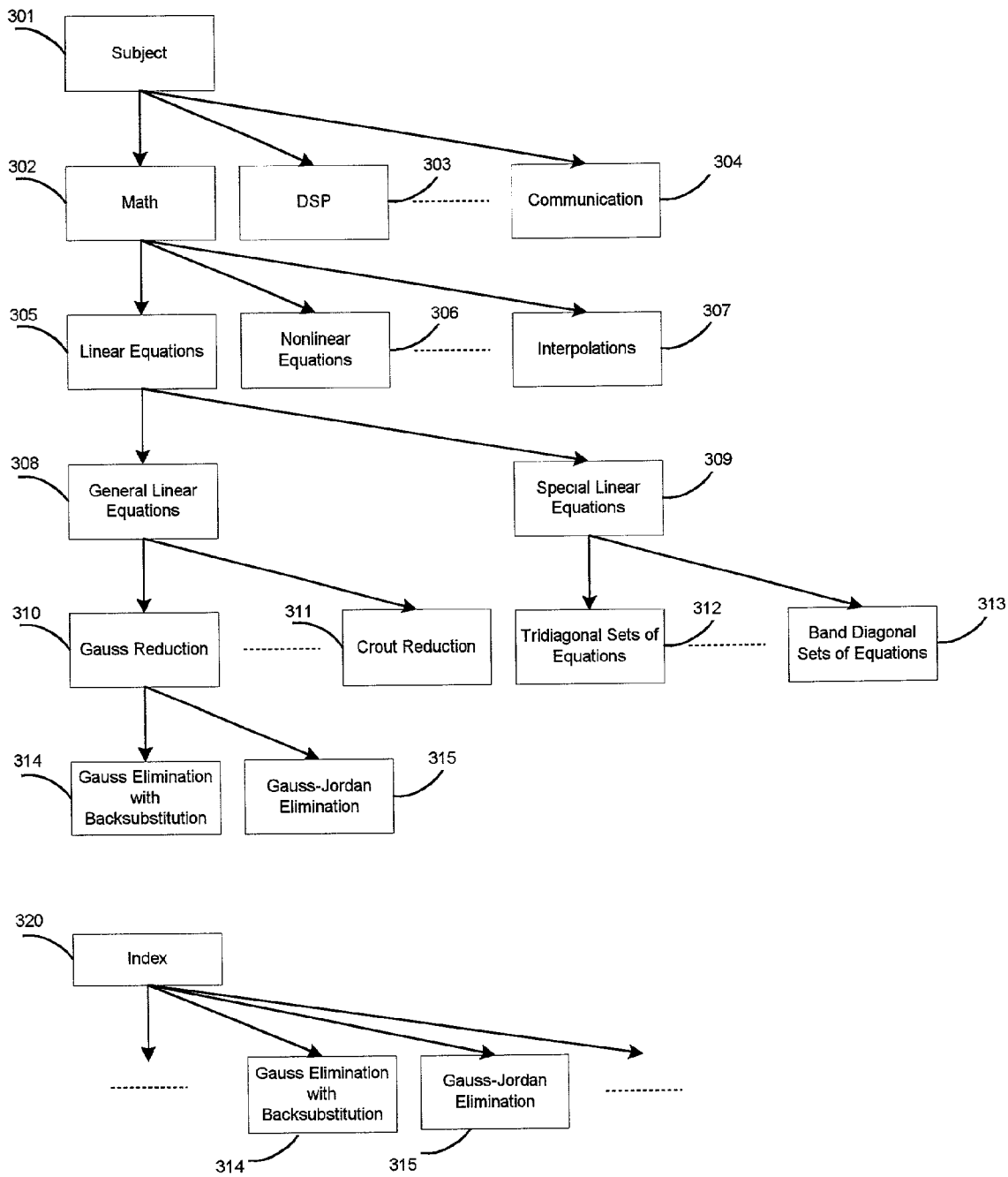
FIG. 3 illustrates how the functions organize in database.

FIG. 3 illustrates how to access the functions in database. When there is a need to use some function in the libraries, user can proceed by three ways. If user knows the name of that function, user can associate the function in the working document to the library function by assigning a property "Associated Function Name" to the function in working documents, and then setting the property to the library function name. Other two ways are related to the help files. There are two major categories under help button, one is subject and another is index. After "Associated Function Name" property is assigned to a function in the current working document, user can start searching the corresponding library function through subject or index.

Under subject 301, there are different libraries such as Math 302, DSP 303, and Communication 304. Each library is further separated into different sub categories. Under Math 302, there are Linear Equations 305, Nonlinear Equations 306, . . . , and Interpolations 307. Under Linear Equations 305, there are General Linear Equations 308 and Special Linear Equations 309. Under General Linear Equations 308, there are Gauss reduction 310, . . . , and Crout reduction 311. Under Special Linear Equations 309, there are Tridiagonal Sets of Equations 312, . . . , and Band Diagonal Sets of Equations 313. Under Gauss reduction 310, there are Gauss Elimination with Back substitution 314 and Gauss-Jordan elimination 315. After locating the right function in the libraries, the software system will associate the library function with the one in current working document together.

Also the user can go to the index 320, search the index to find the right mathematics methods and associate the function in current working document with the one such as Gauss Elimination with Back substitution 314 or Gauss-Jordan elimination 315.

The variable association could be controlled by some default variable association rule. In case the default variable association rule does not apply, or user wants to control the variable associations, user can open up the corresponding help file. Then user can manually associate each variable of the function in the current working document to the corresponding symbol in the mathematics formula or the corresponding function argument in the help file.

Figure 4:
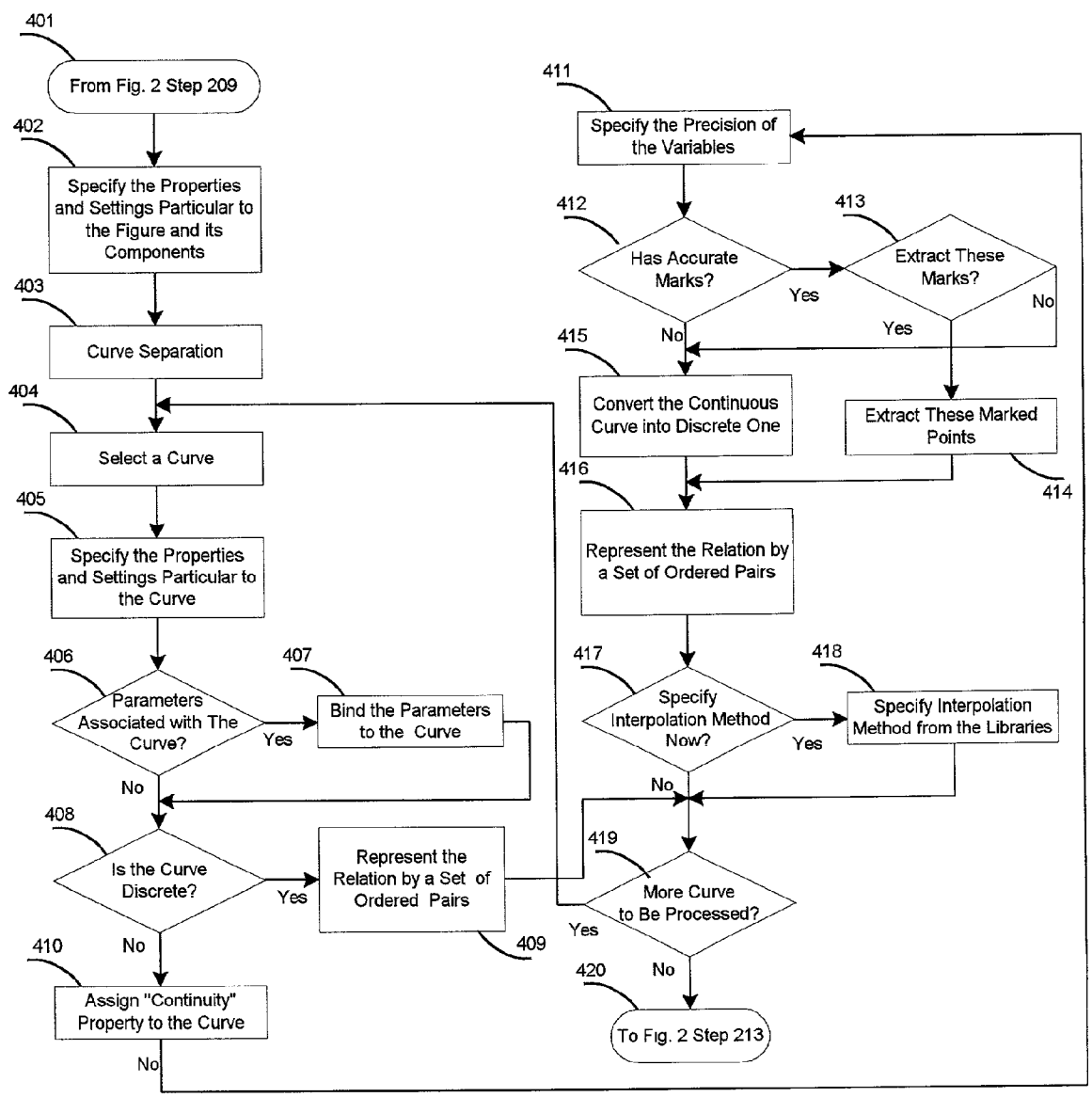
FIG. 4 illustrates an overview of operational steps in flow diagram form for the curve processing subsystem of the general computing software system of the present invention.

FIG. 4 illustrates an overview of operational steps in flow diagram form for the processing curve subsystem of the general computing software system of the present invention. It starts at step 401 that is following the step 209 in FIG. 2.

At step 402, user can assign properties and change the default settings particular to a figure. Various properties such as title, parameter, and variable will be assigned to the figure and its corresponding components explicitly or implicitly. Some properties such as the properties related to title, parameters, and variables, could have corresponding components on the figure. Some other properties, such as the properties related to the index of curves, the relation name between x-axis and y-axis, and the precision and the valid ranges of x-axis and y-axis, could have no directly corresponding components on the figure.

These assigned properties will help the software system to extract information from the curves correctly and to describe these curves accurately and effectively. Though the figures of curves may look total different, there are many common properties among them. Usually, there are title, parameter, and range of x-axis and y-axis. Another common usage of curve is to find y-value when x-value is given. It could be very nature to use object-oriented method to describe the curves. In an object-oriented method, curve object will be used to extract information from curves, to save the information without confusion, to retrieve the information, and to redraw the curves. One of the most desired capabilities on the curve object is to find y-value when x-value and the related parameters are given. With such a capability, user can calculate y-value when x-value and related parameters are given without manually measuring the y-value from the curve. For each instance of a curve object, there is a corresponding symbol name for this instance. Also each instance could have a text name.

At step 403, the software system separates the curves when there are more than one curve in the figure. The curve separation can be done with the information collected by figure editor or by pattern recognition at step 205. Usually, different curves could be generated by calling different functions or using different sets of parameters. Further, different curves could be drawn using different colors, or using different line patterns, or having different marks on them, or having different parameters pointed to them. These differences could be used by figure editor or pattern recognition to distinguish different curves.

At step 404, the software system will select one curve automatically or provide an interface for user to select one. The later case could happen when user only wants to process some of the curves or process the curves in a preferred order. A curve index will be assigned to the curve. The curve index is used to distinguish one curve from another one. If an object-oriented method is used, the system will create a different curve sub-object for a different curve index. This sub-object will inherit various properties from its parent and will be responsible for collecting and reconstruct the information related to the corresponding curve.

At step 405, user can assign properties and change the default settings particular to the current selected curve. For example, user may have to specify the precision and ranges of variables when the precision and ranges of the variables are not the default precision and ranges.

At step 406, check if there is any parameter associated with the curve. Usually if there are several curves in a figure, there are some parameters associated with each curve. Again, the information obtained by figure editor or pattern recognition at step 205 could be useful.

At step 407, the parameters will be bounded with the curve. This could be done by associating the parameters with the corresponding curve index or the corresponding curve sub-object.

At step 408, test if the curve if discrete. Again this could be done by using the information collected by figure editor or pattern recognition at step 205. If it is discrete, at step 409, represent the relation by a set of ordered pairs and associate this set to the curve index or the curve sub-object. If not, at step 410, assign the property "Continuum" to the curve index or the curve sub-object. This property will tell the software to use some interpolation method to generate a continuous curve when the curve needs to be drawn back or to provide some median values when these median values are needed.

At step 411, specify the preferred precision of the variables if they are not the default one.

At step 412, test if there are accurate marks by using the collected information. Usually the relations at these marks are actually obtained from calculation or simulation, and the rest of curve is the smooth connection of these marks. If there are accurate marks, then proceed to step 413 to see if user wants to extract these accurate marks.

When user does want to extract these accurate marks, at step 414, these marked points should be extracted. If there is no accurate mark, or the user does not want to extract these accurate marks, proceeds to step 415. Here a continuous curve will be converted into a discrete curve with a preferred precision.

At step 416, the software system represents the relation between x-axis and y-axis by a set of ordered pairs and associate this set to the curve index or the curve sub-object.

At step 417, the software system will inquire if the user wants to specify the interpolation method now. If yes, at step 418, user can specify one of the interpolation methods available in the libraries.

At step 419, check if there is more curve to be handled. If yes, go back to step 404 and repeat step 404 to step 419. If not, proceed to step 420 and returns to the step 213 in FIG. 2.

Figure 5:
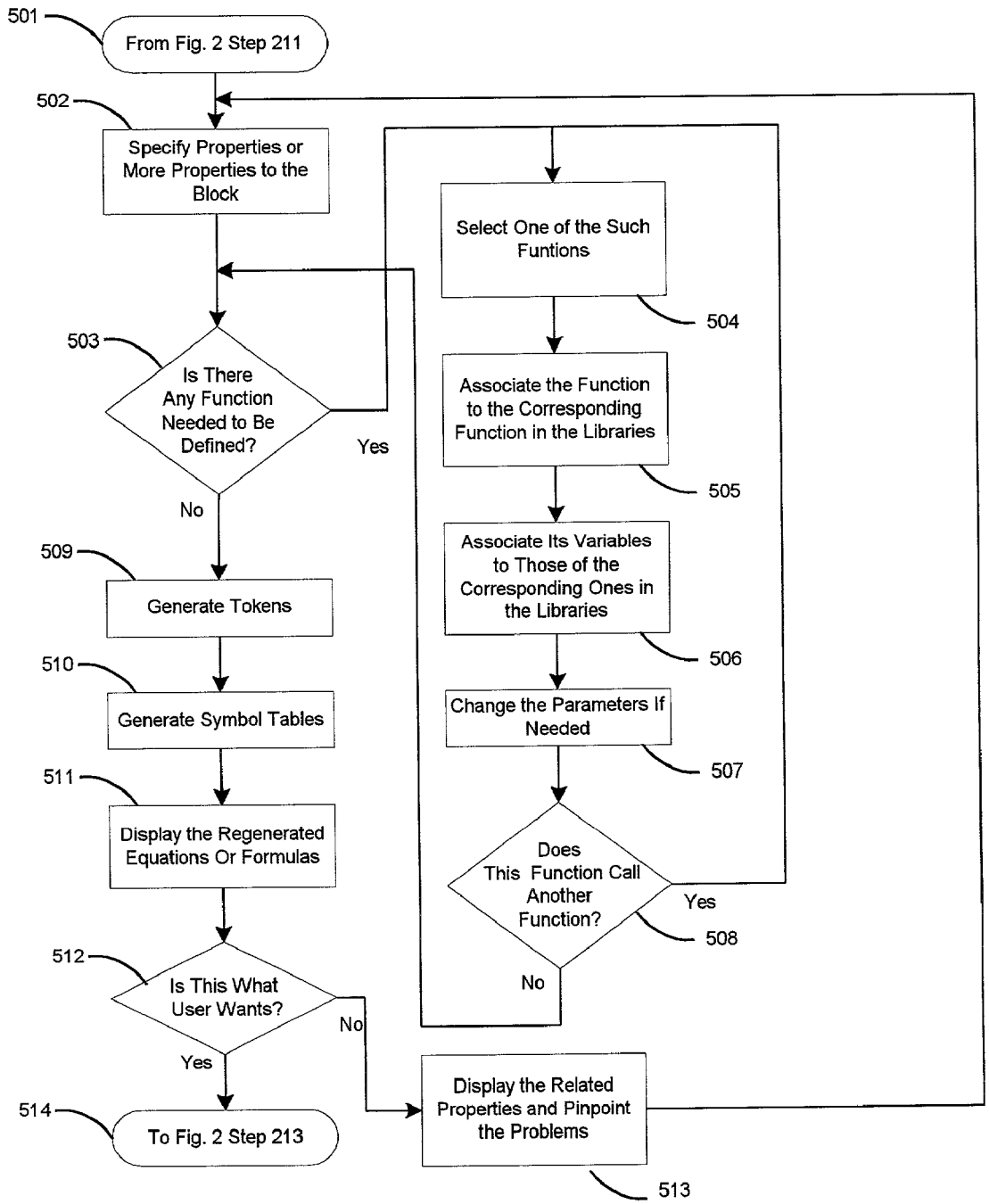
FIG. 5 illustrates an overview of operational steps in flow diagram form for the formula processing subsystem of the general computing software system of the present invention.

FIG. 5 illustrates an overview of operational steps in flow diagram form for the processing formula subsystem of the general computing software system of the present invention. Step 501 is followed the output of step 211 of FIG. 2.

At step 502, various properties particular to this block will be assigned to this block and its items. The software system should provide enough properties to describe the items in a formula. The properties such as "Document Name" could be used to describe the block. User could attach a "Block Name" property to the selected block and fill the property with a text name. The text name could be the same name used on help index. The properties such as "Function Name", "Function Identity", "Have To Be Defined Function" could be used to describe the function in a formula. For example, in the formula $$E(\theta) = \overline{\theta} = \int_0^{2\pi} \theta \cdot f(\theta) d\theta,$$

both E(θ) and $\overline{\theta}$ stand for the function $$\int_0^{2\pi} \theta \cdot f(\theta) d\theta.$$

User could assign a property "Block Name" to the formula and fill the property with a text "The Mean of Theta"; user could assign a property "Function Name" to the formula with its content set to "mean_of_theta"; user could assign "Function Identity" to both E(θ) and $\overline{\theta}$; and user could assign the property "Have to Be Defined Function" to $f(\theta)$. Some properties such as "Variable Type" could have a default link and default setting with some items in a formula. For example, the default variable type of i, j, k, l, m, n could be integer and the default variable type of w, x, y, z could be real. In a particular block, if the default rule does not apply, then the software system will provide user an interface to specify the variable type, or make a guess based on the called function in the library and the corresponding variables of the function. The type of a variable could be integer, Boolean, real, complex, set, function, or any data structure defined in libraries.

At step 503, test if there is any function to be defined in the formula or equation. If there are some functions to be defined, mark all such functions with property "Have to Be Defined Function". At step 504, select one of such external functions and disassociate the property "Have to Be Defined Function" from it.

At step 505, associate the function in the block to the corresponding function in the library by either typing the symbol name of that library function in the related property field, or choosing the library function from index, or searching the library function under subject.

At step 506, associate the variables to the corresponding ones of the library function. This can be done by some default rule also. The default rule could associate variable according to the positions of variables, the name of variables, the type of variables, or all of them together with some priority order if there is a conflict.

From time to time, there could be some parameters associated with a library function. In most of time, these parameters are not part of the variables passed to the function. User can change the parameter values at step 507. The new parameter values are valid only for this particular block and the default parameter values of this function will not be changed. In other words, if this function is called in some other place, the default parameter values will be used unless user changes the parameter values there. A default parameter value could be a default section value or a default library value. The default section value can overwrite the default library value while the value specified by user for this specified instance can overwrite the default section value.

At step 508, check if this library function calls some other functions. If no, go to step 503. If yes, a process similar to step 504 to step 508 will repeat until all the external functions called directly or indirectly by the library function have been associated explicitly or implicitly. In order to be able to mark properties on library functions without literally changing the help files and making confusion, these properties could be saved in documents affiliated with the current working document. So that whenever the working document is open, the affiliated documents will be able to open and set up the environment.

At step 503, if there is no more function needed to be defined, go to step 509.

At step 509, tokens will be generated by scanner. The scanner is similar to the one used by ordinary compiler. Basically, scanner will get rid of unnecessary stuff and record the information in the form of token id. These tokens are atoms in formulas and equations and could be associated with various properties. The process of extracting token is also similar to the process of extracting token in the regular scanner of an ordinary compiler. Of course, there are some major differences between them. First, due to the fact that matrix is two dimension object, the scanner should be a two dimension scanner in nature. However, if in some early stage such as when edited by the mathematics formula editor or processed in pattern recognition, the equation and formula have been preprocessed in such a way that the information regarding to the two dimension of an item has been properly extracted, one dimension scanner could do the work also. Second, beside using the literal information to generate tokens as the regular scanner of an ordinary compiler, the scanner will use all the properties associated with symbols, variables, equations, and formulas to generate the tokens. Third, the scanner could use the information it receives from handling previous blocks. In most of time, the symbols in a file have exactly the same meaning unless they are redefined in a later section. Fourth, because the symbols, equations, and formulas in the working document are different from regular programming file, token ids, token types as well as the special symbols and key word symbols could be very different. For example, ∫ and ∴ are special symbols that will not be met by an ordinary compiler.

At step 510, symbol tables will be generated by parser. Considering various mathematics structures, the parser will check the relations among different items, use symbol tables to describe the relations among them, and prepare for code generation as the regular parser of an ordinary compiler does. Due to the two dimension nature of the matrix, the parser in nature is also two dimension processing. A big difference between regular parser and this parser is that a symbol name which does not appear in the original equations or formulas could be generated. For example, when a set of linear equations are given in non-matrix form, in order to use Gauss Elimination with Back Substitution, one needs to create a coefficient matrix and give a symbol name to this matrix. The software system will provide an interface for user to define a symbol name. User can supply a symbol name. If not, the software system will generate a unique symbol name according to some symbol name generation rule. The symbol tables have all the information about equations and formulas, consisting of various items representing various mathematics objects and their associated properties. The symbol table could use any data structure to describe effectively and exactly the relation among the items. The parser could further collect information from working documents and databases and inquire for specific information when it needs.

Also the software system could do some symbolic simplification on the formula when the formula has a "Symbolic Simplification" property associated with it.

At step 511, the software will regenerate formulas and display them. Because the symbol tables are supposed to have all the necessary information about the formulas, if there is no mistake made in previous stages, the regenerated formulas should look same as the original ones logically. If the regenerated formulas are what the user expects, proceed to 514 and go back to the step 213 of FIG. 2. If not, go to step 513, where user can display the properties of a formula, pinpoint where the problems are. For example, user can display a variable in document, its corresponding name in model file, its corresponding variable in library function, the type and the range of this variable, and its name in programming code. User can display the properties related to an item simultaneously, or display the properties related to an item sequentially, that is, displaying one property of an item, then another property of the item, then another property of the item and so on, or display the property's property of an item. After user has figured out what information should be given to the system, user can assign some particular properties to the block and its components. So in next iteration started at step 502, all these properties could guide software system to do what user wants it to do. The process from step 502 to step 512 will repeat until the regenerated formulas should look same as the original ones logically.

The software package will remember the properties assigned to items, and therefore each iteration would do better than previous one. Of course, one can assign all the needed properties to every item, so that the software system will do everything right at the very first time. However, to make less human interference, perhaps it is worth to use the information provided by a library function and its variables, and the information collected from previous iterations. It could save time to have several iterations rather than one iteration especially when the software system is under its early development stage.

In order to meet each user's special need, the software system should provide user interface to modify properties, define new properties, and specify the corresponding actions.

Although the present invention and its advantage have been described in detail, it should be understood that for those skilled in the field, various changes, substitutions and alterations can be made therein without departing from the spirit and scope of the invention as defined by the appended claims. For example, equipped with higher artificial intelligent database, the software system based on the invention could work without any interference of human being. Another example is that the properties assigned to the items such as symbols, figures, formulas could be more or less depending on how intelligent and complex the software system is. Also the properties could be assigned to an item or to the item on one side or item on another side or both items on each side for the associated item pairs. Further, the properties attached could be implemented in many different ways. For example, one can have many properties and assign each item only one property; also one can have less properties and assign several properties to the same item, or first assign a property to an item, then assign another property to the property of that item, further one can assign a particular property to many items.

What is claimed is:

1. A general computing software system for helping a user to extract information from an information source, generate programming source code, and reconstruct information, said information source comprising text sections, figure sections, and formula sections, said system comprising:

means for setting up environment for said user to specify default binding rules, default programming language, default working path, default parameters, and default connotations of mathematics symbols;

means for selecting portions from said information source, said portions comprising formulas and figures;

means for recognizing symbols, texts, formulas, and figures on said portions;

means for selecting a block, said block containing an element selected from a group consisting of a formula and a figure, said element having a plurality of items, and each of said items being a component selected from a group consisting of a symbol, a parameter, a function, an operator, a label, and a curve;

means for creating identifications to distinguish among said items;

means for associating properties to said block and said items to specify desired relations among said items and desired ways of handling said block and said items;

means for modifying said properties to change said desired relations among said items and said desired ways of handling said block and said items;

means for defining new properties and means for assigning said new properties to said block and said items to provide specific requirements on said block and said items;

means for processing curve to separate curves, extract information from said curves, and generate information for recreating said curves;

means for processing formula to link functions, identify relations among components of a formula, create a reconstructed formula, and display said reconstructed formula;

means for displaying said block and said items;

means for displaying properties associated with said block and said items;

means for adjusting properties to be assigned to said block and said items by using information obtained from handling previous blocks;

means for generating said programming source code;

means for compiling, linking, and running said programming source code and displaying results from running said programming source code; and means for updating database.

2. The system according to claim 1, further comprising means for generating model file and means for modifying said model file, wherein said model file is a file that contains structure information of said programming source code.

3. The system according to claim 1, further comprising:

means for associating default properties to said items and said block to specify default relations among said items and default ways of handling said items and said block; and means for modifying said default properties associated with said items and said block to change said default relations and said default ways of handling said items and said block.

4. The system according to claim 1, further comprising means for adjusting and assigning properties to said previous blocks by making use of information accumulated for handling said block and said items that are under processing, said properties comprising any things associated with said items and needed for extracting information, said items comprising numbers, strings, mathematic symbols, parameters, constants, functions, equations, formulas, figures, and various components of a figure, whereby one property can bind many items, one item can bind many properties, and one property can further bind other properties.

5. The system according to claim 1, further comprising means for displaying and hiding selected aspects of said block and said items, wherein said aspects comprise properties and their associated information.

6. The system according to claim 1, wherein said means for processing curve comprises:

means for separating curves into a group of separated curves;

means for selecting a curve from said group of separated curves;

means for assigning properties to said curve to specify how to extract information from said curve and how to create a regenerated curve;

means for extracting parameters associated with said curve;

means for binding said parameters to said regenerated curve;

means for representing said curve by a plurality of ordered pairs; and means for reconstructing said curve.

7. The system according to claim 6, wherein said means for reconstructing said curve comprises:

means for identifying if said curve, is a continuous curve or a discrete curve;

means for identifying accurate marks on said curve;

means for specifying precision; and means for specifying interpolation method and finding coefficients associated with said interpolation method from said plurality of ordered pairs.

8. The system according to claim 1, said system comprising many commonly used functions in its libraries and said block comprising a formula, wherein said means for processing formula comprises:

means for assigning properties to said block and said items;

means for identifying mathematic symbols and functions in said block;

means for identifying relations among said items;

means for displaying said relations;

means for identifying any undefined functions;

means for searching from said libraries for library functions related to said undefined functions;

means for associating an undefined function with a corresponding library function and means for associating arguments of said undefined function with corresponding arguments of said corresponding library function;

means for changing parameters associated with said corresponding library function;

means for creating a regenerated formula;

means for displaying said regenerated formula; and means for modifying properties of said formula, deleting properties of said formula, defining new properties, and adding said new properties to said formula.

9. The system according to claim 8, wherein said means for identifying relations among said items comprises means for generating tokens by a scanner and means for creating symbol tables by a parser.

10. The system according to claim 8, said formula comprising a function and said function having a plurality of variables and a plurality of parameters, further comprising means for assigning as many properties to said function, said variables, and said parameters as needed directly and indirectly, simultaneously and gradually, recursively and non-recursively.

11. The system according to claim 1, wherein said means for displaying properties further comprises:

means for displaying simultaneously all properties related to an item;

mean for displaying sequentially all properties related to an item;

means for displaying a particular property and all items related to said particular property;

means for displaying property's property of an item; and means for displaying properties in any combination of above means.

12. The system according to claim 9, wherein said means for generating tokens by a scanner, each of said token being an inseparable item associated with certain properties, said scanner being a two dimension processing in nature, whereby said scanner uses not only literal information from an item but also properties associated with said item as well as information obtained from handling other items and previous blocks.

13. The system according to claim 9, wherein said means for generating symbol tables by a parser, said symbol tables being instances of data structures to describe relations among all items of a formula, said parser being a two dimension processing in nature, whereby said parser uses a grammar based on various mathematic structures and properties associated with said items, collects information about said items, and requires specific information from an intelligent source, and inserts extra items into said symbol tables to describe said formula effectively.

14. The system according to claim 1, wherein said means for recognizing symbols, texts, formulas, and figures on said portions is arranged to apply pattern recognition techniques on said portions to identify said symbols, said texts, said formulas, and said figures; wherein said means for updating database further comprises means for selecting and saving model files and programming source code, means for converting data from one format into different formats and saving data in a desired format, means for creating help files, and means for maintaining database; and wherein said means for creating identifications creates new symbols from said symbols, new texts from said texts, new formulas from said formulas, and new figure from said figures with each of said new symbols, each of said new texts, each of said new formulas, and each of said new figures having a corresponding identification.

15. A computing software system having common used functions in its libraries for a user to regenerate and verify contents in a document, said document comprising a plurality of formula blocks, said system comprising means for identifying said formula blocks, means for processing formula block, means for generating source code, means for compiling, linking and running said source code, and means for displaying results, wherein said means for processing formula block carried out for each of said formula blocks comprises:
   means for assigning properties to a formula block selected from said formula blocks and items of said formula block;
   means for identifying and selecting an undefined function in said formula block;
   means for searching for a corresponding library function in said libraries, and associating said undefined function with said corresponding library function;
   means for searching for a previously defined function and associating said undefined function with said previously defined function;
   means for identifying relations among said items to create a symbol table for said items;
   means for reconstructing said each block to create a corresponding regenerated block; and
   means for displaying said regenerated block,
   whereby functions in said formula blocks will be linked to corresponding functions in said libraries and corresponding functions defined previously,
   whereby means for compiling, linking and running said source code will compile, link, and run said source code to regenerate said results,
   whereby means for displaying results will display said results in proper forms, and
   whereby said user can compare said results with said contents to verify said contents on said document.

16. The system according to claim 15, wherein said means for processing formula block further comprises:
   means for modifying said properties to give descriptions more specific to said each block and said items; and
   means for defining new properties to specify further requirements on said each block and said items.

17. The system according to claim 15, wherein said means for processing formula block further comprises:
   means for associating arguments of said undefined function with corresponding arguments of said corresponding library function;
   means for specifying parameters associated with said corresponding library function; and
   means for displaying properties associated with said regenerated block.

18. A computing software system having common used functions in its libraries for a user to regenerate and verify contents on a document, said document comprising a plurality of curve blocks, each of said curve blocks containing a plurality of curves, said system comprising means for identifying said curve blocks, means for processing curve block, means for generating source code, means for compiling, linking and running said source code, and means for displaying results, wherein said means for processing curve block carried out for each of said curve blocks comprises:
   means for assigning properties to a curve block selected from said curve blocks and items of said curve block;
   means for separating each curve from a group of curve in said curve block to generate a group of separated curves;
   means for selecting one curve from a group of separated curves and specifying properties to said one curve;
   means for identifying parameters associated with said one curve and binding said parameters with said one curve;
   means for extracting information from said curve; and
   means for representing said curve.

19. The system according to claim 18, wherein said means for extracting information from said curve further comprises:
   means for identifying if said curve is a continuous curve or a discrete curve;
   means for identifying if said curve has accurate marks on it and means for extracting information from these marks;
   means for converting continuous curve into discrete one;
   means for specifying an interpolation method; and
   means for finding coefficients associated with said interpolation method.

20. The system according to claim 18, wherein said means for selecting one curve from a group of separated curves further comprises:
   means for selecting a curve based on different curve having a different color;
   means for selecting a curve based on different curve having a different line pattern;
   means for selecting a curve based on different curve having a different line weight; and
   means for selecting a curve based on different curve having a different label.

* * * * *